US008451141B2

(12) United States Patent
Uechi et al.

(10) Patent No.: US 8,451,141 B2
(45) Date of Patent: May 28, 2013

(54) INTERSECTION VISIBILITY DETERMINATION DEVICE, VEHICLE WITH INTERSECTION VISIBILITY DETERMINATION DEVICE, AND METHOD FOR DETERMINING INTERSECTION VISIBILITY

(75) Inventors: Masaaki Uechi, Nisshin (JP); Kazuya Sasaki, Sunto-gun (JP); Masumi Kobana, Fuji (JP); Kazunori Higuchi, Aichi-gun (JP); Mitsuteru Kokubun, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 430 days.

(21) Appl. No.: 12/935,759

(22) PCT Filed: Mar. 27, 2009

(86) PCT No.: PCT/IB2009/005346

§ 371 (c)(1), (2), (4) Date: Sep. 30, 2010

(87) PCT Pub. No.: WO2009/122284

PCT Pub. Date: Oct. 8, 2009

(65) Prior Publication Data

US 2011/0025529 A1 Feb. 3, 2011

(30) Foreign Application Priority Data

Mar. 31, 2008 (JP) ................................ 2008-090195

(51) Int. Cl.
*G08G 1/09* (2006.01)
*B60Q 1/00* (2006.01)

(52) U.S. Cl.
USPC ........... 340/905; 340/901; 340/903; 340/435; 340/436; 382/104; 701/117; 701/301

(58) Field of Classification Search
USPC ........................................................ 340/905
See application file for complete search history.

(56) References Cited

U.S. PATENT DOCUMENTS 6,967,593 B2 * 11/2005 Carroll ......................... 340/907
2002/0110261 A1 8/2002 Yanai (Continued)

FOREIGN PATENT DOCUMENTS

EP 1 233 390 8/2002
EP 1 632 923 3/2006

(Continued)

OTHER PUBLICATIONS

International Search Report issued Sep. 10, 2009 in PCT/IB09/005346 filed Mar. 27, 2009.

(Continued)

*Primary Examiner* — Donnie Crosland
(74) *Attorney, Agent, or Firm* — Oblon, Spivak, McClelland, Maier & Neustadt, L.L.P.

(57) ABSTRACT

An intersection visibility determination device includes an ECU that determines visibility at an intersection. When a host vehicle approaches an intersection with a stop sign, the ECU calculates conflict points at which a trajectory vector of the host vehicle intersects with virtual trajectory vectors of intersecting objects, which are presumed to come from the right side and the left side of the intersection, respectively. The conflict points are calculated based on information on types and traveling positions of the intersecting objects. The ECU sets visibility determination areas at the intersection as viewed from the host vehicle based on the positions of the conflict points, the right-side and the left-side visibility target distances, and the current location of the host vehicle, and calculates, based on the visibility determination areas, visibility distances that are used as visibility parameters indicating whether the visibility at the intersection is good or poor.

7 Claims, 8 Drawing Sheets

U.S. PATENT DOCUMENTS

| | | | |
|---|---|---|---|
| 2004/0158390 | A1 | 8/2004 | Mukaiyama |
| 2005/0222753 | A1 | 10/2005 | Ishikawa |
| 2006/0055525 | A1 | 3/2006 | Kubota et al. |

FOREIGN PATENT DOCUMENTS

| | | |
|---|---|---|
| JP | 10 250507 | 9/1998 |
| JP | 2003 99898 | 4/2003 |
| JP | 2003 170760 | 6/2003 |
| JP | 2004 51059 | 2/2004 |
| JP | 2005 63398 | 3/2005 |
| JP | 2006 24103 | 1/2006 |
| JP | 2007 266976 | 10/2007 |
| JP | 2007 336466 | 12/2007 |

OTHER PUBLICATIONS

Japanese Office Action issued Oct. 26, 2009 in corresponding JP 2008-090195 filed Mar. 31, 2008.

* cited by examiner

INTERSECTION VISIBILITY DETERMINATION DEVICE, VEHICLE WITH INTERSECTION VISIBILITY DETERMINATION DEVICE, AND METHOD FOR DETERMINING INTERSECTION VISIBILITY

BACKGROUND OF THE INVENTION

1. Field of the Invention

The invention relates to an intersection visibility determination device that determines visibility at an intersection before a host vehicle, a vehicle in which the intersection visibility determination device is mounted, and a method for determining the visibility at the intersection.

2. Description of the Related Art

An intersection visibility determination device described in Japanese Patent Application Publication No. 2003-99898 (JP-A-2003-99898) is an example of related art. The intersection visibility determination device according to JP-A-2003-99898 detects intersection information as to whether a road on which a host vehicle is present is a road that has lower priority than an intersecting road that intersects with the road on which the host vehicle is present or a road in which vehicles need to stop before entering the intersection of this road and the intersecting road. The intersection visibility determination device also detects visibility distance from the front end of the host vehicle to the center of a lane of the intersecting road, in which a vehicle that will cross the intersection is present. Then, the intersection visibility determination device estimates the probability that a driver of the host vehicle will meet with an accident based on the intersection information, the visibility distance, etc.

However, with the related art described above, the visibility distance may not be appropriately determined when it is expected that an object that is coming from the left side of the intersection and an object that is coming from the right side of the intersection are different in type, for example, when a bicycle is coming from the left side of the intersection and is traveling on a sidewalk that is on the right side of the intersecting road as viewed from this bicycle and a motorcycle traveling on the intersecting road is coming from the right side of the intersection.

SUMMARY OF THE INVENTION

The invention provides an intersection visibility determination device and method for appropriately determining visibility at an intersection even when different types of objects are presumed to come from the right side and the left side of the intersection, respectively, and a vehicle to which the intersection visibility determination device or method is applied.

A first aspect of the invention relates to an intersection visibility determination device that determines visibility at an intersection before a host vehicle. The intersection visibility determination device includes: intersection information obtaining means for obtaining information regarding the intersection before the host vehicle; and visibility parameter determination means for determining, based on the information regarding the intersection, a visibility parameter that indicates whether the visibility at the intersection as viewed from the host vehicle is good or poor. The intersection information obtaining means obtains, as the information regarding the intersection, information including the type and the traveling position of an intersecting object that is traveling on a road, which intersects with a road on which the host vehicle is present, and that is presumed to cross the intersection.

According to the first aspect of the invention, the information regarding the intersection before the host vehicle, which includes the type and the traveling position of the intersecting object that is traveling on the road, which intersects with the road on which the host vehicle is present, and that is presumed to cross the intersection, is obtained, and the visibility parameter for the intersection is determined based on the information. In this way, even if the intersecting object that is coming from the right side of the intersection and the intersecting object that is coming from the left side of the intersection are presumed to be different in type and traveling position, it is possible to determine the appropriate visibility parameter. Accordingly, even in such a case, it is possible to appropriately determine whether the visibility at the intersection is good or poor.

The visibility parameter determination means may set a visibility determination area at the intersection as viewed from the host vehicle based on the information including the type and the traveling position of the intersecting object, and may determine the visibility parameter based on the visibility determination area.

The visibility determination area at the intersection as viewed from the host vehicle may be set based on a conflict point at which a trajectory vector of the host vehicle intersects with a virtual trajectory vector of the intersecting object, a virtual braking distance for the intersecting object, and positional information regarding the host vehicle. Updating the visibility determination area as the vehicle approaches the intersecting makes it possible to determine the appropriate visibility parameter with reliability.

The intersection visibility determination device may further include obstacle detection means for determining whether an obstacle is present in the visibility determination area. The visibility parameter determination means may determine whether the ratio of an angle of the driver's field of view obstructed by the obstacle to an angle of the driver's entire field of view in the visibility determination area is equal to or lower than a predetermined value based on a detection signal from the obstacle detection means, and may determine the visibility parameter based on the visibility determination area when the ratio of the angle of the driver's field of view obstructed by the obstacle to the angle of the driver's entire field of view in the visibility determination area is equal to or lower than the predetermined value.

If an obstacle, for example, a building, is present in the visibility determination area, the presence of the obstacle exerts an influence on a determination as to whether the visibility at the intersection is good or poor. Therefore, whether an obstacle is present in the visibility determination area is determined, and the visibility parameter is determined based on the visibility determination area when the ratio of the angle of the driver's field of view obstructed by the obstacle to the angle of the driver's entire field of view in the visibility determination area is equal to or lower than the predetermined value. In this way, it is possible to more accurately determine whether the visibility at the intersection is good or poor.

The visibility determination area may include a right-side visibility determination area that is on the right side of the intersection as viewed from the host vehicle and a left-side visibility determination area that is on the left side of the intersection as viewed from the host vehicle. When the intersection is present in an area where vehicles need to keep to the left, the visibility parameter determination means may set the right-side visibility determination area to an area larger than the left-side visibility determination area.

When the intersection is in an area where vehicles need to keep to the left, there may be a case where a bicycle traveling on a sidewalk that is on the right side of the intersecting road as viewed from this bicycle is coming from the left side of the intersection and a motorcycle traveling in the intersecting road is coming from the right side of the intersection. In this case, there is a high possibility that the speed of the intersecting object that is coming from the right side of the intersection is higher than speed of the intersecting object that is coming from the left side of the intersection. Therefore, the right-side visibility determination area may be set to an area larger than the left-side visibility determination area.

A second aspect of the invention relates to a vehicle that includes the intersection visibility determination device according to the first aspect of the invention. In the vehicle according to the second aspect of the invention, the information regarding the intersection before the host vehicle, which includes the type and the traveling position of the intersecting object that is traveling on the road, which intersects with the road on which the host vehicle is present, and that is presumed to cross the intersection, is obtained, and the visibility parameter for the intersection is determined based on the information. In this way, even when the intersecting object that is coming from the right side of the intersection and the intersecting object that is coming from the left side of the intersection are presumed to be different in type and traveling position, it is possible to determine the appropriate visibility parameter. Accordingly, even in such a case, it is possible to appropriately determine whether the visibility at the intersection is good or poor. As a result, the vehicle is able to travel more safely.

A third aspect of the invention relates to a method for determining visibility at an intersection before a host vehicle. According to the method, information regarding the intersection before the host vehicle, which includes a type and a traveling position of an intersecting object that is traveling on a road, which intersects with a road on which the host vehicle is present, and that is presumed to cross the intersection, is obtained. Then, based on the information regarding the intersection, a visibility parameter that indicates whether the visibility at the intersection as viewed from the host vehicle is good or poor is determined.

Determining the visibility parameter may include: calculating, based on the intersection information including the type and the traveling position of the intersecting object, a conflict point at which a trajectory vector of the host vehicle intersects with a virtual trajectory vector of the intersecting object that is traveling on the road, which intersects with the road on which the host vehicle is present, and that is presumed to cross the intersection; setting a visibility determination area at the intersection as viewed from the host vehicle based on a position of the conflict point, a visibility target distance that is a virtual braking distance for the intersecting object, and a current location of the host vehicle; and calculating, based on the visibility determination area, a visibility distance that is used as the visibility parameter indicating whether the visibility at the intersection is good or poor.

With the method according to the third aspect of the invention, the information regarding the intersection before the host vehicle, which includes the type and the traveling position of the intersecting object that is traveling on the road, which intersects with the road on which the host vehicle is present, and that is presumed to cross the intersection, is obtained, and the visibility parameter for the intersection is determined based on the information. In this way, even when the intersecting object that is coming from the right side of the intersection and the intersecting object that is coming from the left side of the intersection are presumed to be different in type and traveling position, it is possible to determine the appropriate visibility parameter. Therefore, it is possible to appropriately determine whether the visibility at the intersection is good or poor even in such a case.

According to the aspects of the invention described above, even when different types of objects are coming from the left side and the right side of the intersection, respectively, as viewed from the host vehicle, it is possible to appropriately determine the visibility at the intersection. This makes it possible to appropriately check whether the driver has decelerated the host vehicle and confirmed the safety in an appropriate manner based on the visibility at the intersection.

BRIEF DESCRIPTION OF THE DRAWINGS

The features, advantages, and technical and industrial significance of this invention will be described in the following detailed description of embodiments of the invention with reference to the accompanying drawings, in which like numerals denote like elements, and wherein.

DETAILED DESCRIPTION OF EMBODIMENT

Hereafter, an intersection visibility determination device according to an embodiment of the invention will be described in detail with reference to the attached drawings.

Figure 1:
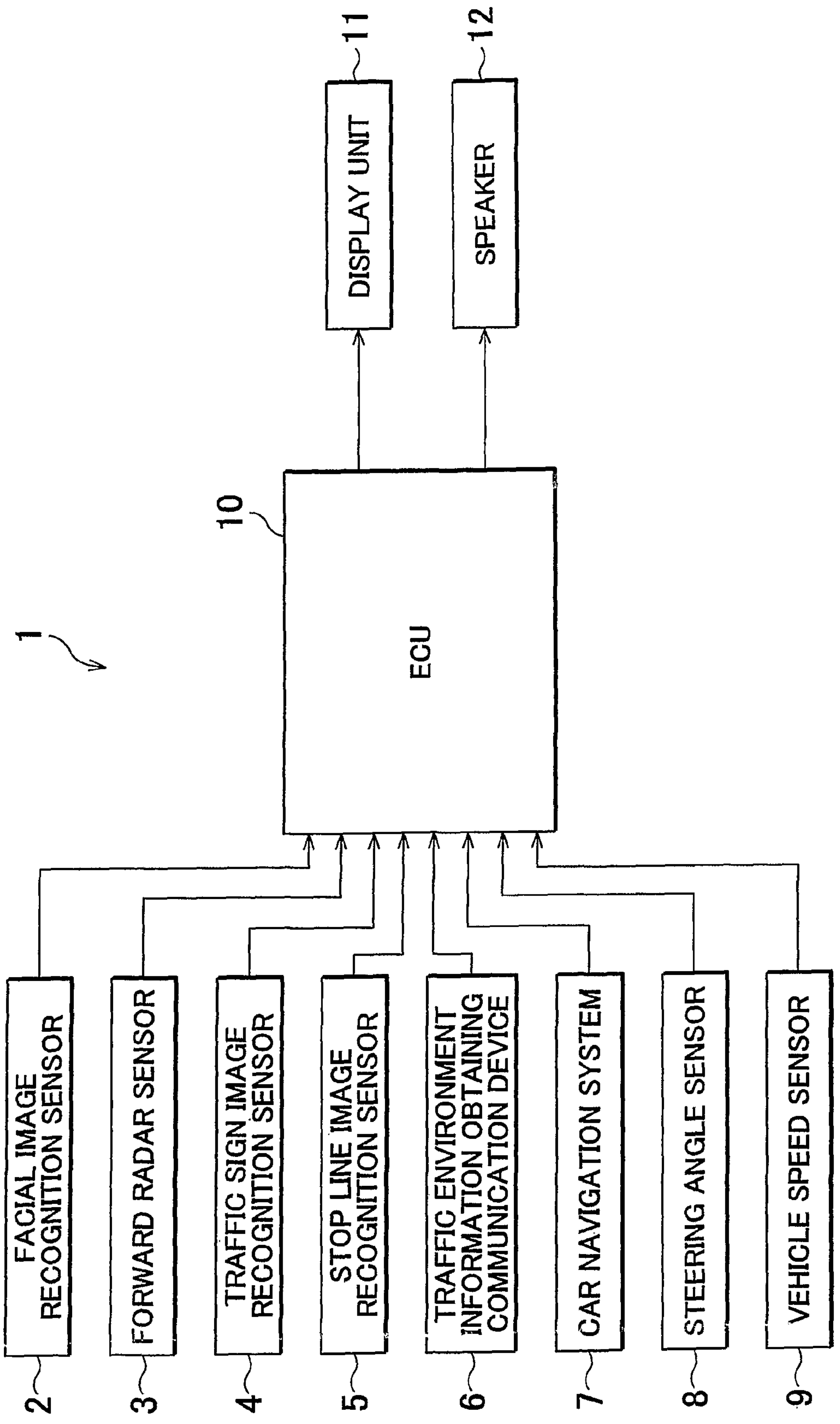
FIG. 1 is a configuration diagram schematically showing a driving behavior check system including an intersection visibility determination device according to an embodiment of the invention.

FIG. 1 is a configuration diagram schematically showing a driving behavior check system that includes an intersection visibility determination device according to an embodiment of the invention. A driving behavior check system 1 in FIG. 1 determines the visibility at an intersection with a stop sign (hereinafter, this intersection will be simply referred to as "intersection") as viewed from a driver of a host vehicle. The driving behavior check system 1 then checks whether the driver has driven the vehicle in an appropriate manner based on the determined visibility at the intersection.

The driving behavior check system 1 includes a facial image recognition sensor 2, a forward radar sensor 3, a traffic sign recognition sensor 4, a stop line image recognition sensor 5, a traffic environment information obtaining communication device 6, a car navigation system 7, a steering angle sensor 8, a vehicle speed sensor 9, an electronic control unit (ECU) 10, a display unit 11, and a speaker 12.

The facial image recognition sensor 2 captures an image of the driver's face to obtain the driver's facial image data, and processes the image data to recognize the orientation of the driver's face and the direction of the driver's gaze. The forward radar sensor 3 is, for example, a millimeter-wave radar, and determines whether there is an obstacle, for example, a building in a visual field diagonally to the front of the driver of the host vehicle. The traffic sign image recognition sensor 4 captures an image of the area in front of the host vehicle to obtain the image data, and processes the image data to recognize traffic signs such as "STOP" sign. The stop line image recognition sensor 5 captures an image of the area in front of the host vehicle to obtain the image data, and processes the image data to recognize a stop line.

The traffic environment information obtaining communication device 6 is, for example, a vehicle-roadside communication device, and obtains traffic environment information, for example, the shape of an intersection, the road width at the intersection, and the speed limit of a road that intersects, at the intersection, with the road on which the host vehicle is traveling. The car navigation system 7 contains map information. The car navigation system 7 obtains information on the current location of the host vehicle with the use of a global positioning system (GPS), and indicates a recommended route to the destination along with the current location of the host vehicle. It is also possible to obtain the shape of the intersection, the road width at the intersection, etc. with the use of the car navigation system 7.

The steering angle sensor 8 detects the steering angle of the host vehicle. The vehicle speed sensor 9 detects the vehicle speed of the host vehicle.

The ECU 10 determines the visibility at the intersection before the host vehicle based on the outputs from the forward radar sensor 3, the traffic sign image recognition sensor 4, the stop line image recognition sensor 5, the traffic environment information obtaining communication device 6, the car navigation system 7, and the steering angle sensor 8. The ECU 10 then checks whether the driver has decelerated the host vehicle and confirmed the safety when entering the intersection based on the outputs from the facial image recognition sensor 2 and the vehicle speed sensor 9. The ECU 10 then informs the driver of the check results with the use of the display unit 11 or the speaker 12. A main component of the ECU 10 is a microcomputer that includes a CPU, a ROM, a RAM, etc.

Figure 2:
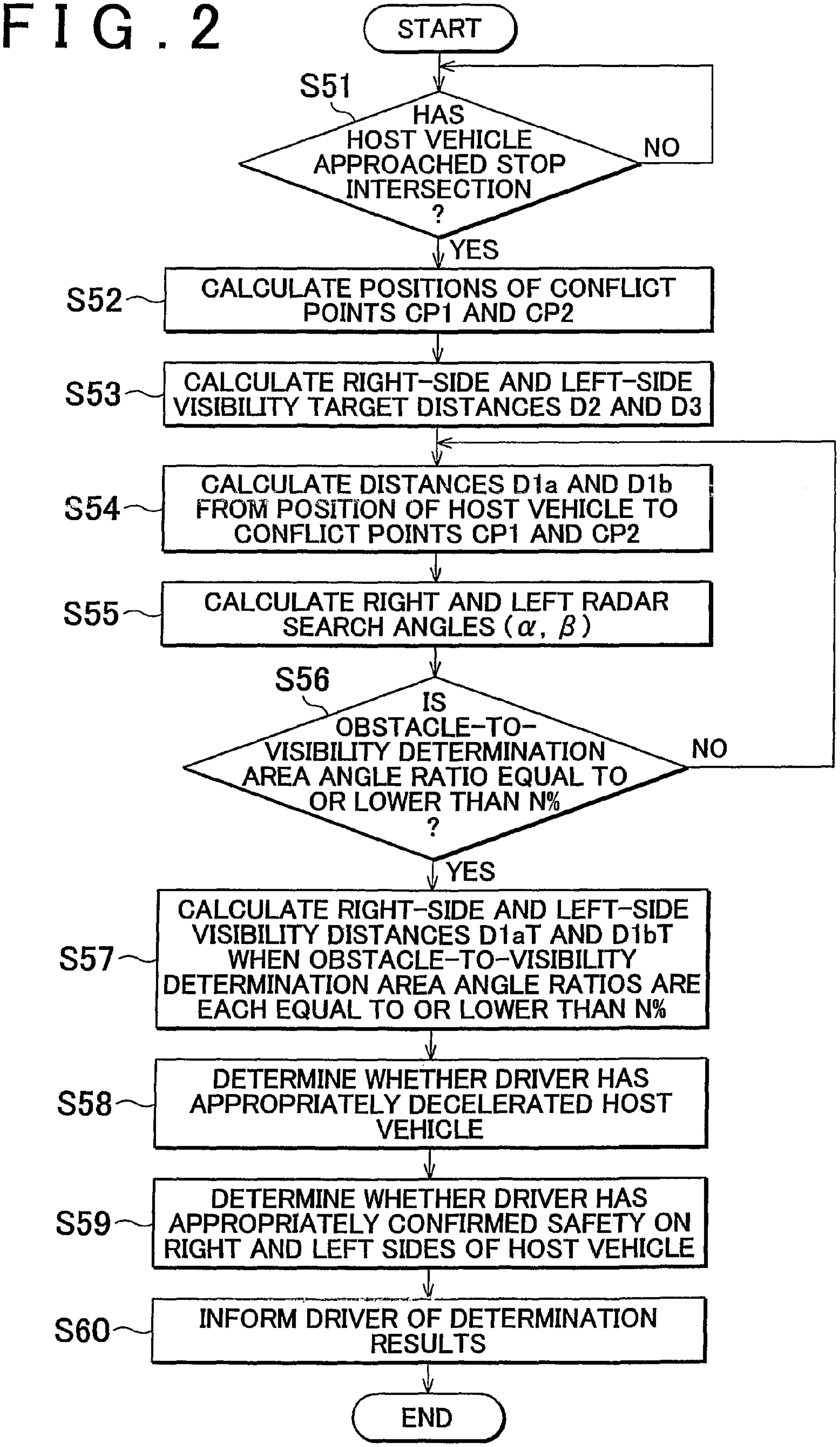
FIG. 2 is a flowchart showing an intersection visibility determination and driving behavior checking routine executed by an ECU shown in FIG. 1.

FIG. 2 is a flowchart showing an intersection visibility determination and driving behavior checking routine executed by the ECU 10.

As shown in FIG. 2, the ECU 10 first determines whether the host vehicle has approached the intersection based on one of the outputs from the traffic sign image recognition sensor 4, the stop line image recognition sensor 5, the traffic environment information obtaining communication device 6, and the car navigation system 7 (S51).

When it is determined that the host vehicle has approached the intersection, the ECU 10 calculates the positions of conflict points CP1 and CP2 based on the information, for example, the shape and size of the intersection obtained by the car navigation system 7 or the traffic environment information obtaining communication device 6 (S52).

Figure 3:
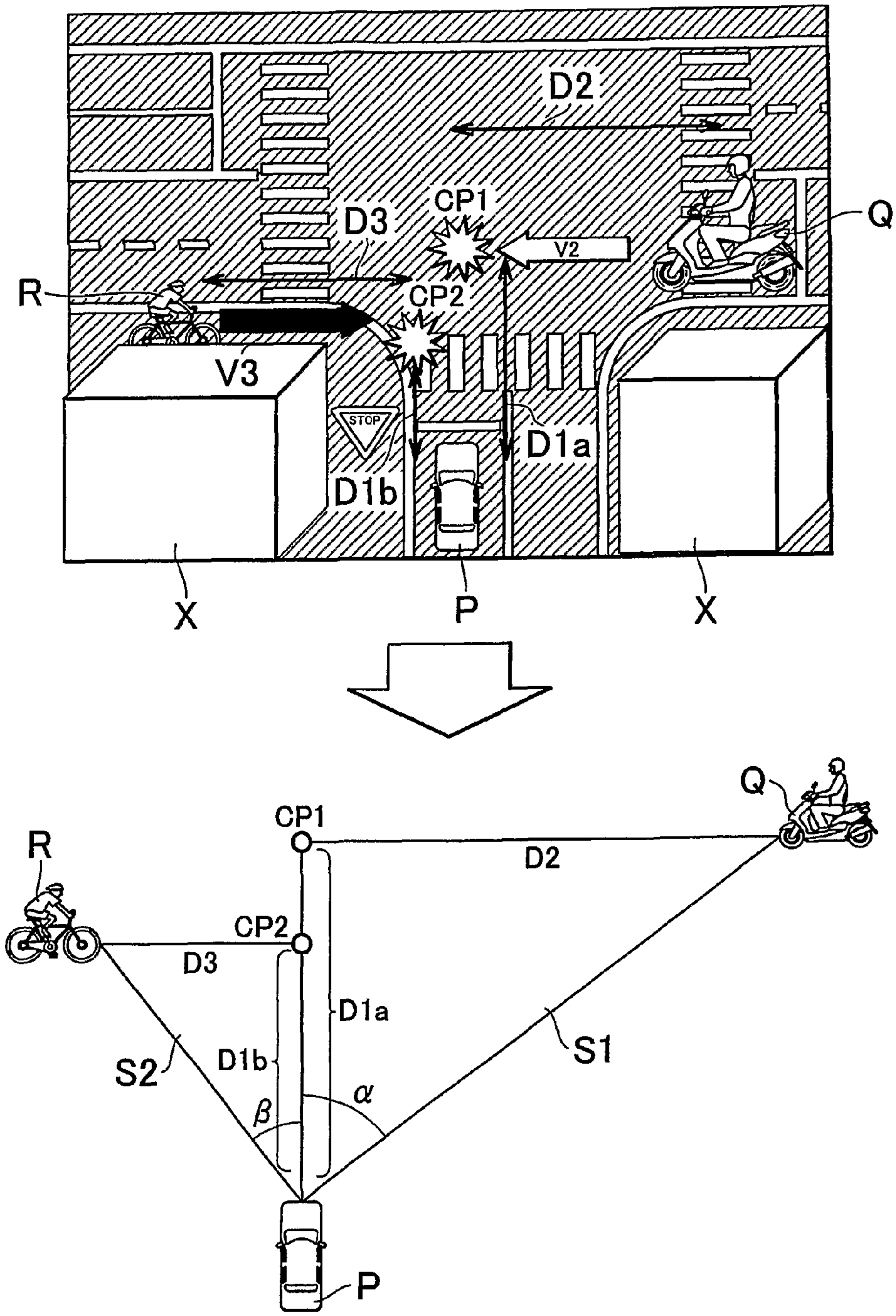
FIG. 3 is a schematic view for defining visibility determination areas at an intersection.
Figure 4:
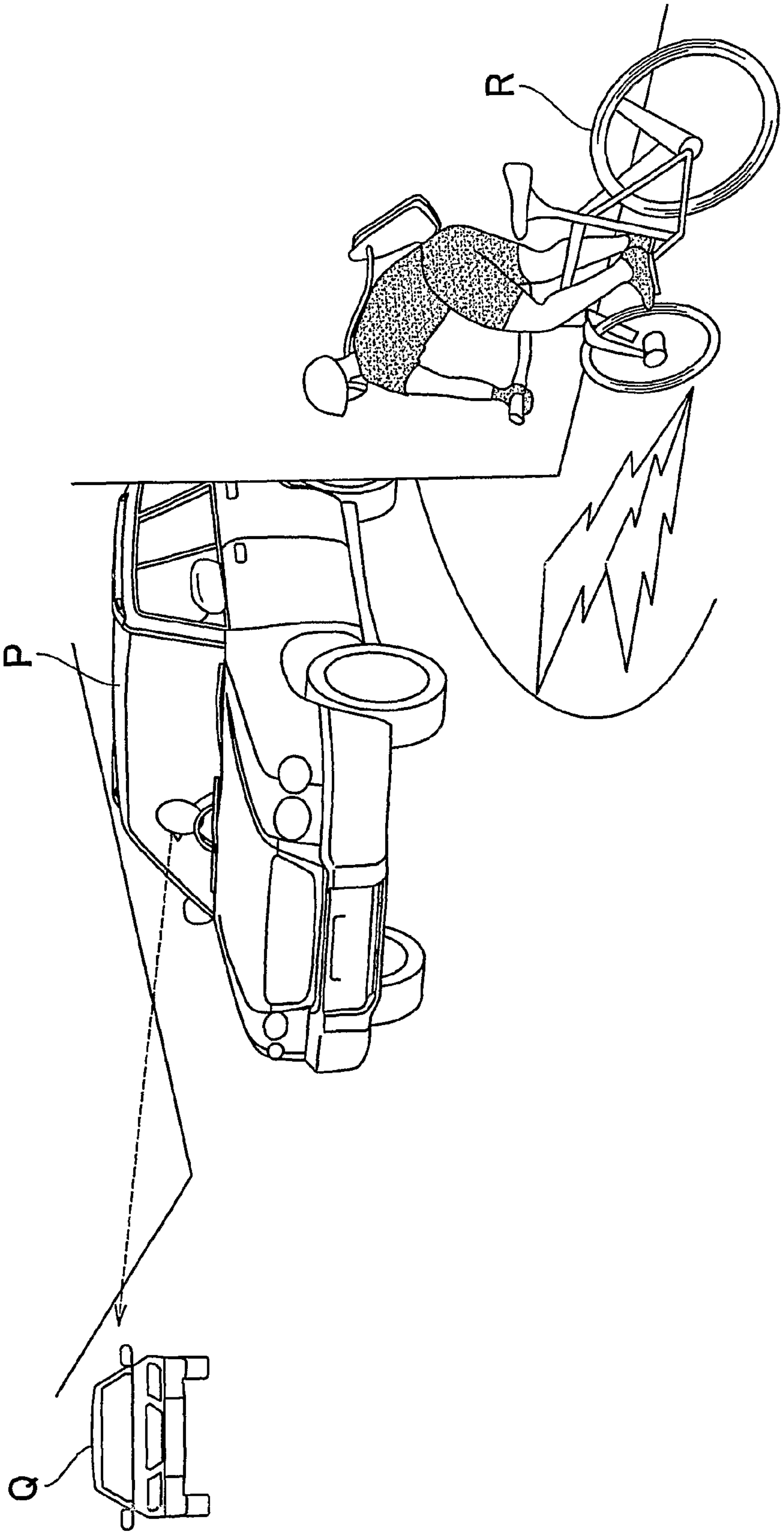
FIG. 4 is a view showing a manner for determining intersecting objects.

As shown in FIG. 3, the conflict point CP 1 is a point at which the trajectory vector of a host vehicle P intersects with a virtual trajectory vector of an intersecting object Q that is presumed to come from the right side of the intersection. The conflict point CP 2 is a point at which the trajectory vector of the host vehicle P intersects with a virtual trajectory vector of an intersecting object R that is presumed to come from the left side of the intersection. As shown in FIG. 4, the intersecting objects Q and R are, for example, a vehicle (e.g., motorcycle) and a bicycle that are traveling on a road that intersects with the road on which the host vehicle P is traveling (hereinafter, this road will be referred to as "intersecting road" where appropriate).

Figure 5:
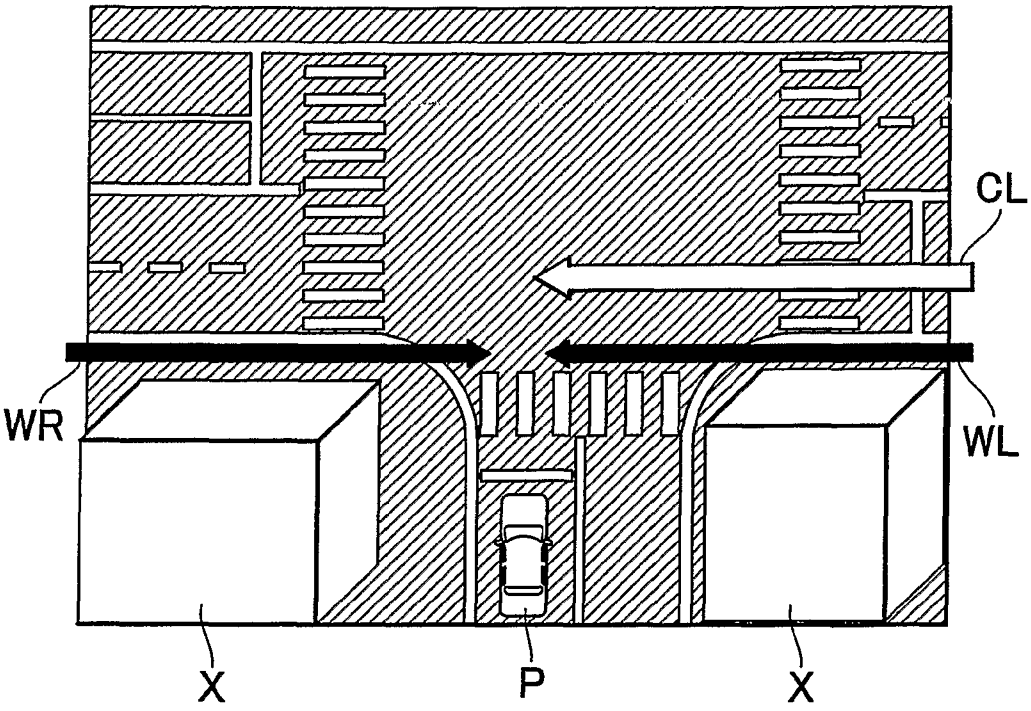
FIG. 5 is a view showing traveling positions (paths) of the intersecting objects.

As shown in FIGS. 3 to 5, a bicycle that is traveling on a sidewalk WR that is on the right side of the intersecting road as viewed from this bicycle (hereinafter, the sidewalk WR will be referred to as "right sidewalk WR") may be regarded as the intersecting object R which is presumed to come from the left side of the intersection. The bicycle that is traveling on the right sidewalk WR is an object that is most likely to be overlooked by the driver of the host vehicle P that is about to enter the intersection, and the person riding the bicycle is a vulnerable road user. As shown in FIGS. 3 to 5, a motorcycle that is traveling on a left lane CL that is in the left side in the intersecting road as viewed from this motorcycle may be regarded as the intersecting object Q which is presumed to come from the right side of the intersection. Also, a bicycle that is traveling on a sidewalk WL that is on the left side of the intersecting road as viewed from this bicycle (hereinafter, the sidewalk WL will be referred to as "left sidewalk WL") may be regarded as the intersecting object Q which is presumed to come from the right side of the intersection.

The information on the shape of the intersection may be obtained based on a position relative to the point at which the steering angle of the host vehicle in the left turn at the intersection reaches the largest steering angle. For example, the conflict point CP1 may be set to a point that is three meters before the point at which the steering angle of the host vehicle in the left turn at the intersection reaches the largest steering angle, and the conflict point CP 2 may be set to a point that is five meters before the point at which the steering angle of the host vehicle in the left turn at the intersection reaches the largest steering angle. However, with this setting method, the conflict points CP1 and CP2 are calculated only after the point at which the steering angle of the host vehicle in the left turn at the intersection reaches the largest steering angle. Therefore, the process is executed after the host vehicle has completed the left turn at the intersection.

Next, the ECU 10 calculates a right-side visibility target distance D2 and a left-side visibility target distance D3 based on the information on the speed limit for the intersecting road obtained by the car navigation system 7 or the traffic environment information obtaining communication device 6, and the positional data on the conflict points CP1 and CP2 calculated in S52 (S53). A stopping distance (braking distance) for the intersecting object Q and a stopping distance (braking distance) for the intersecting object R are used as the right-side visibility target distance D2 and the left-side visibility target distance D3, respectively.

More specifically, each of the stopping distance for the intersecting object Q and the stopping distance for the intersecting object R is calculated by the following equation;

$$\text{stopping distance} = \text{vehicle speed(m/h)}/3600 \times 0.75\text{(s)} + (\text{vehicle speed}/3600)^2/(2 \times 9.8 \times \text{friction coefficient})$$

The following description will be provided on the assumption that the speed limit for the intersecting road shown in FIG. 3 is V2 (e.g., 60 km/h) and the speed of a bicycle is presumed to be V3 (e.g., 30 km/h). In this situation, if there is a motorcycle that is coming from the right side of the intersection, the stopping distance for the motorcycle is calculated as follows;

$$\text{stopping distance} = 60000/3600 \times 0.75 + (60000/3600)^2/(2 \times 9.8 \times 0.7) = 32.7 \text{ m.}$$

In the above-described situation, if there is a bicycle that is coming from the left side of the intersection, the stopping distance for the bicycle is calculated as follows;

$$\text{stopping distance}=30000/3600\times0.75+(30000/3600)^2/(2\times9.8\times0.4)=14.1\text{ m.}$$

Therefore, the right-side visibility target distance D2 is 32.7 m, and the left-side visibility target distance D3 is 14.1 m.

In the above-described situation, for example, if there are two intersecting objects Q coming from the right side of the intersection, which are a motorcycle that is traveling in the left lane CL of the intersecting road at the speed limit and a bicycle that is traveling on the left sidewalk WL as shown in FIG. 5, the braking distance for the motorcycle is set to the right-side visibility target distance D2 because the braking distance for the motorcycle is longer than the braking distance for the bicycle.

Next, the ECU 10 calculates a distance D1$a$ from the current location of the host vehicle to the conflict point CP1 and a distance D1$b$ from the current location of the host vehicle to the conflict point CP2 based on the information on the location of the host vehicle obtained by the car navigation system 7 and the positional data on the conflict points CP1 and CP2 calculated in S52 (S54).

Next, the ECU 10 calculates a right radar search angle (α) and a left radar search angle (β) based on the distance D1$a$ and the distance D1$b$ calculated in S54 and the right-side visibility target distance D2 and the left-side visibility target distance D3 calculated in S53, respectively (S55). The radar search angle α and the radar search angle β are calculated by the following equations.

$$\alpha=\arctan(D2/D1a)$$

$$\beta=\arctan(D3/D1b)$$

Then, a right-side visibility determination area S1 and a left-side visibility determination area S2 at the intersection as viewed from the host vehicle P are set, as shown in FIG. 3. The right-side visibility determination area S1 is in a shape of a upside-down triangle that is defined by a line that connects the current location of the host vehicle P to the conflict point CP1, a line that connects the conflict points CP1 to the position that is apart rightward from the conflict point CP1 by the visibility target distance D2, and a line that connects this position to the current location of the host vehicle P. Similarly, the left-side visibility determination area S2 is in a shape of a upside-down triangle that is defined by a line that connects the current location of the host vehicle P to the conflict point CP2, a line that connects the conflict points CP2 to the position that is apart leftward from the conflict point CP2 by the visibility target distance D3, and a line that connects this position to the current location of the host vehicle P.

For example, as shown in FIG. 3, in the situation where a bicycle that is traveling on the right side walk WR is regarded as the intersecting object R that is presumed to come from the left side of the intersection and a motorcycle that is traveling on the left lane CL is regarded as the intersecting object Q that is presumed to come from the right side of the intersection, the speed of the intersecting object Q that is coming from the right side of the intersection is higher than the speed of the intersecting object R that is coming from the left side of the intersection. Therefore, the distance D1$a$ is longer than the distance D1$b$, and the radar search angle α is larger than the radar search angle β. As a result, the right-side visibility determination area S1 is set to be larger than the left-side visibility determination area S2.

After the right-side visibility determination area S1 and the left-side visibility determination area S2 are set, it is determined with the use of the forward radar sensor 3 whether an obstacle X is present in the right-side visibility determination area S1 and whether an obstacle X is present in the left-side visibility determination area S2.

Figure 6:
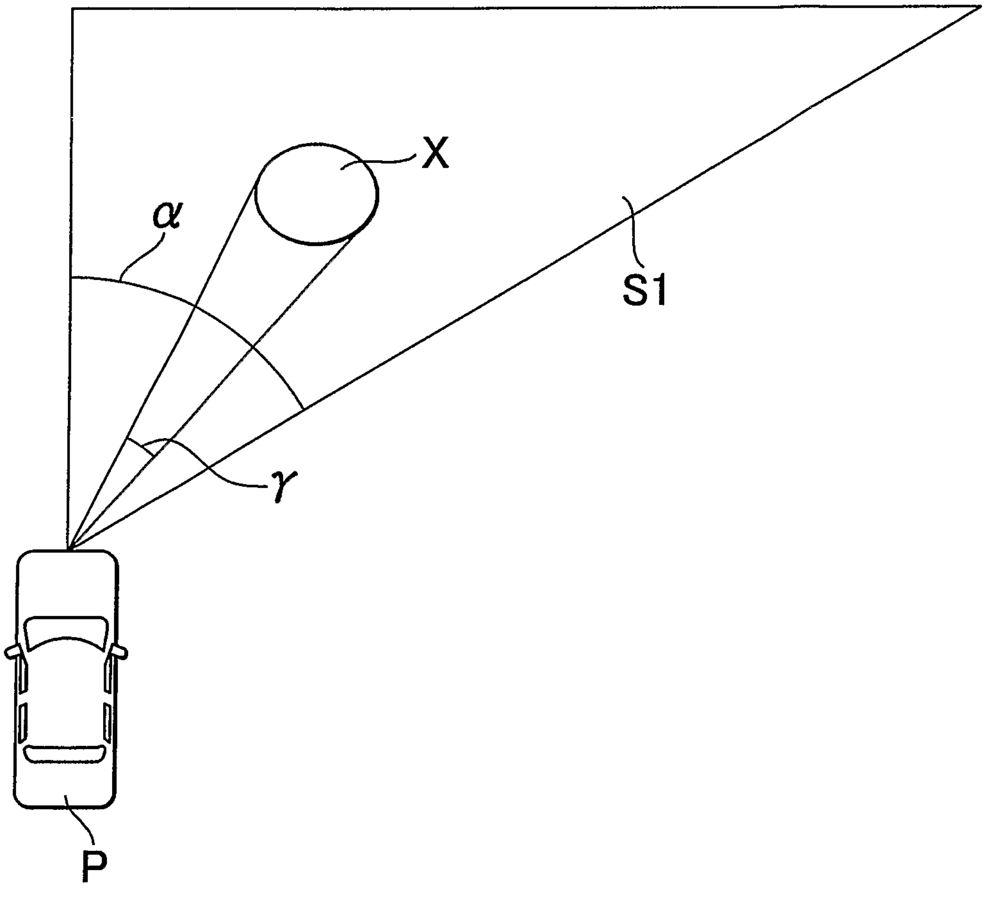
FIG. 6 is a view showing a manner for determining the ratio of an angle of the driver's field of view obstructed by an obstacle to an angle of the driver's entire field of view in visibility determination area.

Next, the ECU 10 determines whether the ratio of an angle of the driver's field of view obstructed by the obstacle X to an angle of the driver's entire field of view in the right-side visibility determination area S1 and the ratio of an angle of the driver's field of view obstructed by the obstacle X to an angle of the driver's entire field of view in the left-side visibility determination area S2 (obstacle-to-visibility determination area angle ratio) are each equal to or lower than a predetermined value based on signals indicating detection results from the forward radar sensor 3 (S56). More specifically, as shown in FIG. 6, the ECU 10 determines whether the ratio of a total angle γ of the driver's field of view obstructed by the obstacle(s) X to an angle α of the driver's entire field of view of the right side of the intersection is equal to or lower than a predetermined value, which is expressed by N %. If it is determined that the ratio of the angle γ to the angle α is equal to or lower than N %, the ECU 10 determines that no obstacle X is present in the right-side visibility determination area S1. Whether the ratio of the angle of the driver's field of view obstructed by the obstacle X to the angle of the driver's entire field of view in the left-side visibility determination area S2 is equal to or lower than the predetermined value is determined in the same manner as described above.

When it is determined in S56 that at least one of the ratio of the angle of the driver's field of view obstructed by the obstacle X to the angle of the driver's entire field of view in the right-side visibility determination area S1 and the ratio of the angle of driver's field of view obstructed by the obstacle X to the angle of the driver's entire field of view in the left-side visibility determination area S2 is higher than the predetermined value, the ECU 10 periodically executes S54 and S55 to update the right-side visibility determination area S1 and the left-side visibility determination area S2 until the ratio of the angle of the driver's field of view obstructed by the obstacle X to the angle of the driver's entire field of view in the right-side obstacle determination area S1 and the ratio of the angle of the driver's field of view obstructed by the obstacle X to the angle of the driver's entire field of view in the left-side obstacle determination area S2 are both equal to or lower than the predetermined value.

Figure 7A:
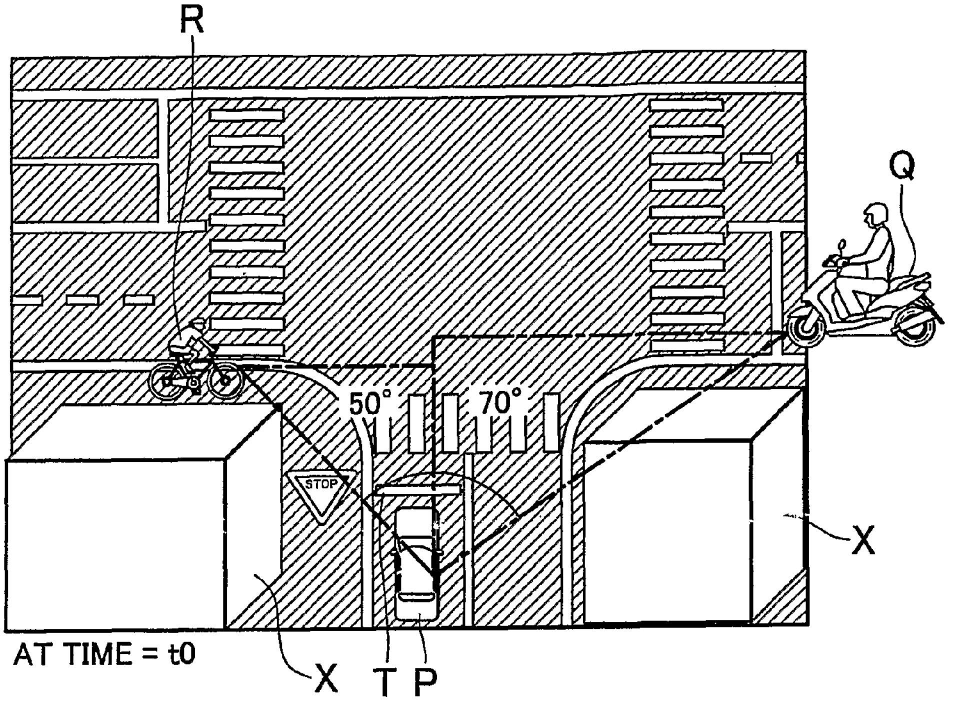
FIGS. 7A and 7B are views showing examples of visibility determination areas at the intersection.
Figure 7B:
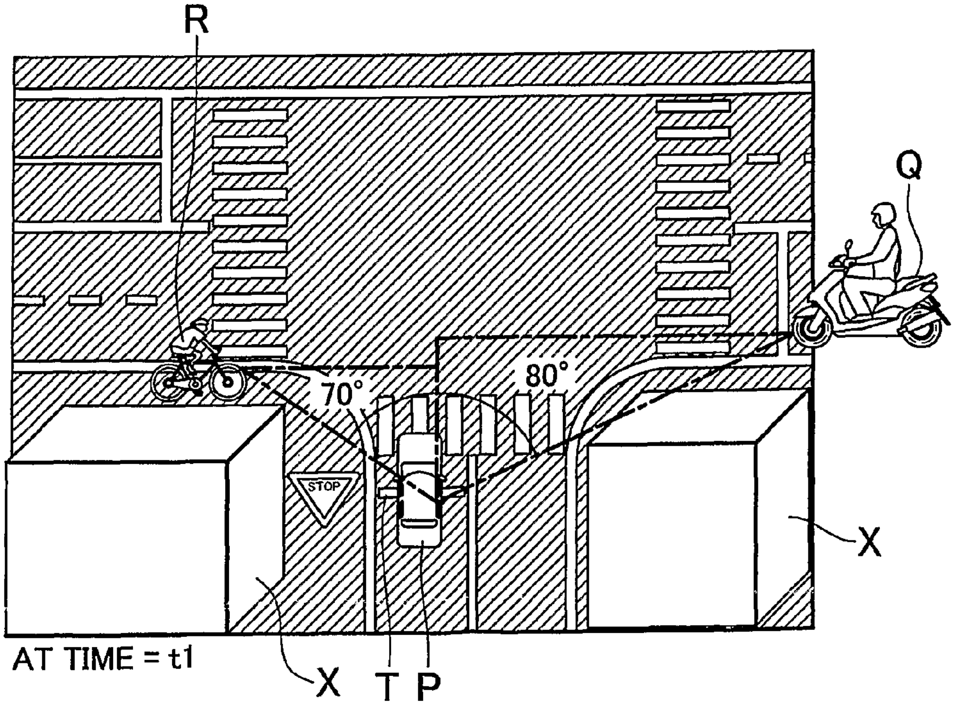

For example, as shown in FIG. 7A, at time $t_0$ at which the host vehicle P is positioned before a stop line T, the radar search angle $\alpha_0$ is 70° and the radar search angle $\beta_0$ is 50°. At time to, the obstacle X is substantially no longer present in the left-side visibility determination area S2, whereas the obstacle X is present in the right-side visibility determination area S1. Then, as shown in FIG. 7B, at time $t_1$ at which the host vehicle P is on the stop line T, the radar search angle $\alpha_0$ is 80° and the radar search angle $\beta_0$ is 70°. At time $t_1$, the obstacle X is substantially no longer present in both the right-side visibility determination area S1 and the left-side visibility determination area S2.

When it is determined in S56 that the ratio of the angle of the driver's field of view obstructed by the obstacle X to the angle of the driver's entire field of view in the right-side visibility determination area S1 and the ratio of the angle of the driver's field of view obstructed by the obstacle X to the angle of the driver's entire field of view in the left-side visibility determination area S2 are both equal to or lower than the predetermined value, the ECU 10 calculates a right-side visibility distance D1$a$T and a left-side visibility distance D1*b*T, which are used as parameters that indicate whether the visibility at the intersection is good or poor (S57). As the right-side visibility distance D1*a*T and the left-side visibility distance D1*b*T are longer, the visibility at the intersection is determined to be better.

More specifically, the distance D1*a*, which is obtained when it is determined that the ratio of the angle of the driver's field of view obstructed by the obstacle X to the angle of the driver's entire field of view in the right-side visibility determination area S1 and the ratio of the angle of the driver's field of view obstructed by the obstacle X to the angle of the driver's entire field of view in the left-side visibility determination area S2 are both equal to or lower than the predetermined value, is set to the right-side visibility distance D1*a*T. The distance D1*b*, which is obtained when it is determined that the ratio of the angle of the driver's field of view obstructed by the obstacle X to the angle of the driver's entire field of view in the right-side visibility determination area S1 and the ratio of the angle of the driver's field of view obstructed by the obstacle X to the angle of the driver's entire field of view in the left-side visibility determination area S2 are both equal to or lower than the predetermined value, is set to the left-side visibility distance D1*b*T.

Figure 8:
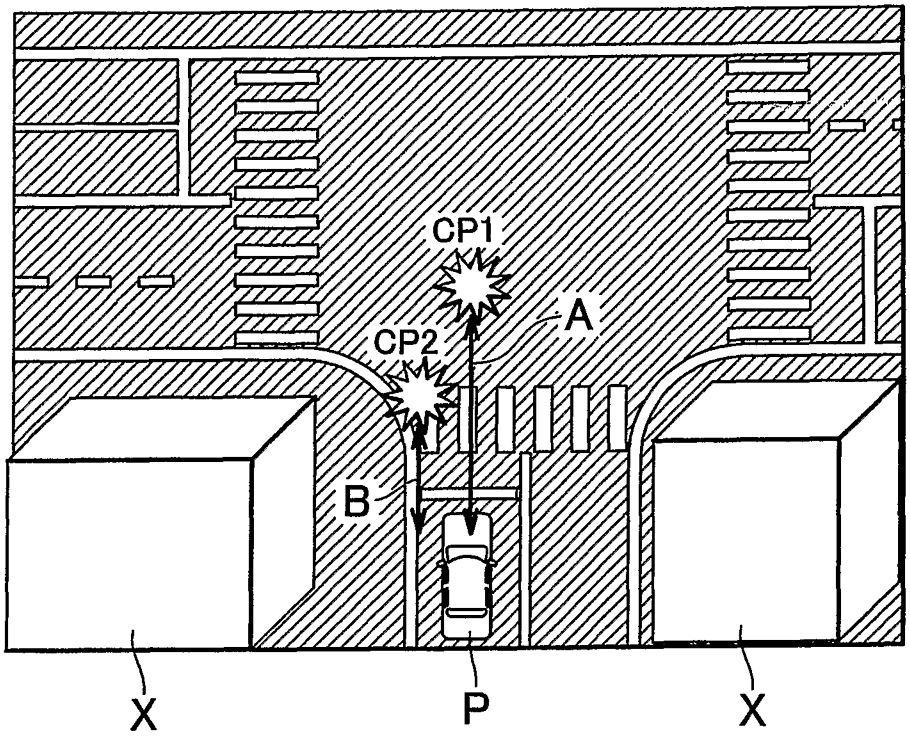
FIG. 8 is a view showing a manner for determining check sections in which a driver's driving behavior is checked.

Then, driving behavior check sections, in which the driving behavior of the driver is checked, are determined based on the right-side visibility distance D1*a*T and the left-side visibility distance D1*b*T at the intersection. For example, as shown in FIG. 8, the section between the point, which is before the conflict point CP1 by the right-side visibility distance D1*a*T, and the conflict point CP1 is defined as a driving behavior check section A. When the host vehicle P is in the driving behavior check section A, it is determined whether the driver drives the host vehicle P appropriately to avoid collision with the intersecting object Q that is presumed to come from the right side of the intersection. In addition, the section between the point, which is before the conflict point CP2 by the right-side visibility distance D1*b*T, and the conflict point CP2 is defined as a driving behavior check section B. When the host vehicle P is in the driving behavior check section B, it is determined whether the driver drives the host vehicle P appropriately to avoid collision with the intersecting object R that is presumed to come from the left side of the intersection. The lengths of the driving behavior check sections A and B may be increased to some extent based on the accuracy of determining the conflict points CP1 and CP2.

Next, the ECU 10 determines based on the value detected by the vehicle speed sensor 9 whether the driver has decelerated the host vehicle P in an appropriate manner based on the right-side visibility distance D1*a*T and the left-side visibility distance D1*b*T at the intersection (S58). More specifically, if an average vehicle speed of the host vehicle P in the driving behavior check sections A and B is equal to or lower than a predetermined speed (e.g., 7 km/h), it is determined that the driver has decelerated the host vehicle P in an appropriate manner.

Next, the ECU 10 determines based on the data output from the facial image recognition sensor 2 (recognition data on the orientation of the driver's face and the direction of the driver's gaze) whether the driver has confirmed the safety on the right side and the left side of the intersection in an appropriate manner based on the right-side visibility distance D1*a*T and the left-side visibility distance D1*b*T at the intersection (S59). More specifically, if the driver has confirmed the safety on the right side of intersection the predetermined number of times (e.g., twice) or more when the host vehicle P is in the driving behavior check section A, it is determined that the driver has confirmed the safety on the right side of the intersection in an appropriate manner. If the driver has confirmed the safety on the left side of intersection the predetermined number of times (e.g., twice) or more when the host vehicle P is in the driving behavior check section B, it is determined that the driver has confirmed the safety on the left side of the intersection in an appropriate manner.

Next, the ECU 10 determines based on the determination results obtained in S S58 and S59 whether the driver has driven the host vehicle in an appropriate manner, and informs the driver of the determination result through screen display with the use of the display unit 11 or by voice with the use of the speaker 12 (S60).

S51 and S52 executed by the ECU 10 with the use of the traffic environment information obtaining communication device 6 and the car navigation system 7 may be regarded as intersection information obtaining means for obtaining the information on the intersection before the host vehicle. S53 to S57 executed by the ECU 10 may be regarded as visibility parameter determination means for determining, based on the information on the intersection, the parameters that indicate whether the visibility at the intersection as viewed from the host vehicle is good or poor.

In the embodiment of the invention described above, the right-side visibility determination area S1 and the left-side visibility determination area S2 are set taking into account the types and traveling positions of the intersecting objects Q and R that will cross the intersection. Then, it is determined whether the obstacle X is present in the right-side visibility determination area S1 and whether the obstacle X is present in the left-side visibility determination area S2. Then, the right-side visibility distance D1*a*T and the left-side visibility distance D1*b*T, which are defined when the ratio of the angle of the driver's field of view obstructed by the obstacle X to the angle of the driver's entire field of view in the right-side visibility determination area S1 and the ratio of the angle of the driver's field of view obstructed by the obstacle X to the angle of the driver's entire field of view in the left-side visibility determination area S2 are both equal to or lower than the predetermined value, are calculated and used as the visibility at the intersection. Even if the intersecting object Q that is coming from the right side of the intersection and the intersecting object R that is coming from the left side of the intersection are different in type and traveling position, for example, if a bicycle traveling on the right sidewalk WR is coming from the left side of the intersection and a motorcycle traveling on the left lane CL of the intersecting road is coming from the right side of the intersection, it is possible to appropriately quantify the visibility at the intersection and determine appropriately whether the visibility is good or poor. As a result, it is possible to accurately check whether the driver has decelerated the vehicle and confirmed the safety in an appropriate manner based on the visibility at the intersection.

The invention is not limited to the aforementioned embodiment. For example, in the embodiment of the invention described above, the right-side visibility determination area S1 is set to an area larger than the left-side visibility determination area S2 taking into account the fact that vehicles such as automobiles and motorcycles need to keep to the left. However, in some foreign countries and regions where vehicles need to keep to the right, a bicycle that is traveling on a sidewalk that is on the left side of the intersecting road as viewed from this bicycle may be regarded as an intersecting object which is presumed to come from the right side of the intersection, and a motorcycle that is traveling on a right-side portion of the intersecting road as viewed from this motorcycle may be regarded as an intersecting object which is presumed to come from the left side of the intersection.

Therefore, in this case, the left-side visibility determination area may be set to an area larger than the right-side visibility determination area.

In the embodiment of the invention described above, the driving behavior check system that includes the intersection visibility determination device has been described. However, the intersection visibility determination device may be applied to, for example, a drive assist system.

The invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A method for determining visibility at an intersection before a host vehicle, comprising:

obtaining information regarding the intersection before the host vehicle, the information including a type and a traveling position of an intersecting object that is traveling on a road, which intersects with a road on which the host vehicle is present, and that is presumed to cross the intersection; and setting, based on the information regarding the intersection, a visibility determination area at the intersection as viewed from the host vehicle; and determining, based on the visibility determination area, a visibility parameter that indicates whether the visibility at the intersection as viewed from the host vehicle is good or poor.

2. The method according to claim 1, wherein determining the visibility parameter includes:

calculating, based on the intersection information including the type and the traveling position of the intersecting object, a conflict point at which a trajectory vector of the host vehicle intersects with a virtual trajectory vector of the intersecting object that is traveling on the road, which intersects with the road on which the host vehicle is present, and that is presumed to cross the intersection, setting a visibility determination area at the intersection as viewed from the host vehicle based on a position of the conflict point, a visibility target distance that is a virtual braking distance for the intersecting object, and a current location of the host vehicle; and calculating, based on the visibility determination area, a visibility distance that is used as the visibility parameter indicating whether the visibility at the intersection is good or poor.

3. An intersection visibility determination device that determines visibility at an intersection before a host vehicle, comprising:

an intersection information obtaining unit that obtains information regarding the intersection before the host vehicle, the information including a type and a traveling position of an intersecting object that is traveling on a road, which intersects with a road on which the host vehicle is present, and that is presumed to cross the intersection; and a visibility parameter determination unit that sets, based on the information regarding the intersection, a visibility determination area at the intersection as viewed from the host vehicle, and that determines, based on the visibility determination area, a visibility parameter that indicates whether the visibility at the intersection as viewed from the host vehicle is good or poor.

4. The intersection visibility determination device according to claim 3, wherein the visibility parameter determination unit sets the visibility determination area at the intersection as viewed from the host vehicle based on a conflict point at which a trajectory vector of the host vehicle intersects with a virtual trajectory vector of the intersecting object, a virtual braking distance for the intersecting object, and positional information regarding the host vehicle.

5. The intersection visibility determination device according to claim 3, further comprising:

obstacle detection means for determining whether an obstacle is present in the visibility determination area, wherein the visibility parameter determination unit determines whether a ratio of an angle of a driver's field of view obstructed by the obstacle to an angle of a driver's entire field of view in the visibility determination area is equal to or lower than a predetermined value based on a detection signal from the obstacle detection means, and determines the visibility parameter based on the visibility determination area when the ratio of the angle of the driver's field of view obstructed by the obstacle to the angle of the driver's entire field of view in the visibility determination area is equal to or lower than the predetermined value.

6. The intersection visibility determination device according to claim 3, wherein:

the visibility determination area includes a right-side visibility determination area that is on a right side of the intersection as viewed from the host vehicle and a left-side visibility determination area that is on a left side of the intersection as viewed from the host vehicle; and when the intersection is present in an area where vehicles need to keep to the left, the visibility parameter determination unit sets the right-side visibility determination area to an area larger than the left-side visibility determination area.

7. A vehicle comprising the intersection visibility determination unit according to claim 3.

* * * * *